Patented July 31, 1923.

1,463,190

UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING BENZOIC ACID AND SALTS THEREOF.

No Drawing.   Application filed March 11, 1920.  Serial No. 365,082.

*To all whom it may concern:*

Be it known that I, EDWIN O. BARSTOW, a citizen of the United States, and a resident of Midland, county of Midland, and State of Michigan, have invented a new and useful Improvement in Methods of Making Benzoic Acid and Salts Thereof, of which the following is a specification, the principle of the invention being herein explained and the best mode in which I have contemplated applying that principle, so as to distinguish it from other inventions.

The present invention has more particular regard to certain improvements in the process of manufacturing benzoates, described and claimed in U. S. Letters Patent No. 939,584, issued to me under date of November 9, 1909, and in two companion patents of the same date, viz, Nos. 939,940 and 939,941, granted upon applications divided out of such original case. The general process exemplified in the aforesaid patents, briefly stated, consists in oxidizing to the acid a side chain substitution product of a member of the benzene series of hydrocarbons, by means of a chlorine-containing reagent in the presence of a basic neutralizing agent and a suitable solvent.

The prescribed course of procedure, utilizing certain specific materials, as described in my aforesaid patents, consisted in agitating one part of benzyl chloride with three parts of water to form an emulsion, then running into a solution made by dissolving three and one-half parts of bleaching powder in twenty parts of water, and thereupon adding one-third part of slaked lime. Upon heating and stirring this mixture, calcium benzoate is formed, the operation being described as carried on in a common cement-lined retort provided with a reflux condenser, an agitator, and direct steam and water connections for regulating the temperature.

As a result of further study and experiment, I have now found that by carrying on the operation in question, or a similar operation involving the use of equivalent reagents in an apparatus capable of withstanding pressure, I can obtain a much higher yield than by operating under ordinary pressure, also that the operation may be very considerably expedited, all as will be hereinafter fully described and particularly pointed out in the claims.

It will be understood that the following description sets forth in detail certain steps embodying my present invention, but that such disclosed steps constitute but one of various ways in which the principle of the invention may be used.

Referring further to the method of operation heretofore employed in carrying out the general reaction involved, the bleaching powder solution, as already noted, was mixed with the benzyl chloride in a separate vessel, and the mixture then was run into the mixture of lime and water in a reaction vessel of the type described, such reaction vessel being maintained at a temperature of about 95° C. Said vessel was provided with a cover and return condenser, and means also had to be provided for checking the reaction, as by spraying water under the cover of such vessel, when such reaction became too vigorous; otherwise the mixture would boil and froth to such an extent as to overflow the vessel and clog the condenser. Under the circumstances stated, it takes from one-half to three-quarters of an hour to run the charge into the reaction vessel, if such boiling over or frothing is to be avoided.

According to my present improved process I place the entire charge, consisting of such previously mixed benzyl chloride and bleaching powder, together with the mixture of lime and water, in a vessel capable of withstanding high pressure, sealing such vessel, and then heating the charge to approximately 95° C. As soon as the reaction temperature, which lies between 90° and 95° C., is reached, the reaction begins, and, being exothermic, the application of external heat is discontinued and such reaction allowed to proceed of itself. The reaction vessel is preferably provided with an agitator, and the mixture is stirred constantly thereby until the reaction is complete. As a result, such reaction will be carried to completion within a very few (three or four) minutes, and at the same time I find that a much better yield of the desired calcium benzoate is obtained than where the slower method of procedure is observed. All necessity for the use of a condenser is done away with, and the operation evidently very much simplified as well as expedited. It will be understood that the pressure hereinbefore referred to as being developed in the course of the reaction is due simply to the generation of steam from the water, where water is the solvent used, and it is such steam, or equivalent vapor, that I have in mind when I speak herein of gases given off during the reaction.

After the reaction is complete, as evidenced by no further rise of temperature or pressure, the resulting product, in the form of calcium benzoate, is recovered from the solution in any well known manner. It will be understood that, as in the case of my general process, so the present improvement thereof is not limited to the utilization of bleaching powder as the specific oxidizing agent, but that alkaline hypochlorites may be used instead.

The increased yield is primarily due to the fact that there is no loss of raw material, practically all of the ingredients employed in the reaction being utilized without any residuum remaining in the reaction vessel. This has not been found to be the case where such reaction is conducted as set forth in my prior patents. Furthermore, by maintaining a pressure as hereinbefore described, the tendency, which is quite pronounced, for the mixture in the reaction vessel to foam unduly is practically entirely overcome, thus contributing materially to the smoothness of the operation and the promptitude with which it proceeds.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making benzoic acid and salts thereof, the step which consists in oxidizing to the acid a side-chain substitution product of a member of the benzene series of hydrocarbons by means of a chlorine-containing reagent in the presence of a basic neutralizing reagent, such oxidizing step being conducted under pressure.

2. In a method of making benzoic acid and salts thereof, the step which consists in oxidizing to the acid a side-chain substitution product of a member of the benzene series of hydrocarbons by means of a chlorine-containing reagent in the presence of a basic neutralizing reagent, such oxidizing step being conducted in a closed vessel under the pressure developed by the gases given off during the reaction.

3. In a method of making benzoic acid and salts thereof, the step which consists in oxidizing benzyl chloride to the acid by means of bleaching powder in the presence of water and excess lime, such oxidizing step being conducted under pressure.

4. In a method of making benzoic acid and salts thereof, the step which consists in oxidizing benzyl chloride to the acid by means of bleaching powder in the presence of water and excess lime, such oxidizing step being conducted in a closed vessel under the pressure developed by the gases given off during the reaction.

5. In a method of making benzoic acid and salts thereof, the steps which consist in placing a mixture of bleach liquor containing excess lime with benzyl chloride in a closed vessel, and thereupon heating such mixture to approximately 95° C., whereupon the oxidation of such benzene derivative to the acid will begin and proceed promptly to completion.

Signed by me, this 8th day of March, 1920.

EDWIN O. BARSTOW.